US010731533B2

(12) United States Patent
Naumann et al.

(10) Patent No.: US 10,731,533 B2
(45) Date of Patent: Aug. 4, 2020

(54) METHOD FOR DETERMINING THE TEMPERATURE OF AN ELECTRICALLY HEATABLE CATALYTIC CONVERTER

(71) Applicant: VOLKSWAGEN AKTIENGESELLSCHAFT, Wolfsburg (DE)

(72) Inventors: Hardy Naumann, Wolfsburg (DE); Stefan Paukner, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/370,300

(22) Filed: Mar. 29, 2019

(65) Prior Publication Data
US 2019/0331015 A1  Oct. 31, 2019

(30) Foreign Application Priority Data
Apr. 30, 2018  (DE) .................. 10 2018 110 382

(51) Int. Cl.
*F01N 11/00* (2006.01)
*F01N 3/20* (2006.01)

(52) U.S. Cl.
CPC .......... *F01N 3/2026* (2013.01); *F01N 11/005* (2013.01); *F01N 2900/1602* (2013.01)

(58) Field of Classification Search
CPC ...... F01N 3/027; F01N 3/2013; F01N 3/2026; F01N 2240/16; F01N 2550/22; F01N 2900/0602; F01N 2900/1602
See application file for complete search history.

(56) References Cited

U.S. PATENT DOCUMENTS 5,904,902 A     5/1999  Matuoka et al.
2008/0234875 A1*  9/2008  Nomura ............. G05D 23/2401
                                                          700/300
(Continued)

FOREIGN PATENT DOCUMENTS

DE  89 05 073 U1   8/1990
DE  196 45 577 A1  5/1997
(Continued)

OTHER PUBLICATIONS

Extended Search report for European Patent Application No. EP 19 16 7837, dated Sep. 23, 2019.
(Continued)

*Primary Examiner* — Jonathan R Matthias
(74) *Attorney, Agent, or Firm* — Pearl Cohen Zedek Latzer Baratz LLP (57) ABSTRACT

A method for determining the temperature of an electrically heatable catalytic converter having an electric heating element that includes a heating resistor, the electrical resistance of which changes as a function of the component temperature of the electrically heatable catalytic converter. This resistance is determined from the current intensity and the voltage at the electrically heatable catalytic converter, and is used to determine the component temperature of the catalytic converter, based on a characteristic curve stored in the control unit. The energization of the heating resistor for determining the component temperature takes place in each case for only a short time in order to minimize the energy input into the heating resistor and thus avoid overheating of the heating resistor. In addition, by use of the short time interval, the aim is to minimize the energy requirements for determining the component temperature of the electrically heatable catalytic converter.

8 Claims, 5 Drawing Sheets

(56) References Cited

U.S. PATENT DOCUMENTS

| | | | |
|---|---|---|---|
| 2011/0270568 A1 | 11/2011 | Hirai et al. | |
| 2014/0182272 A1* | 7/2014 | Czimmek | F01N 3/2013 60/274 |
| 2017/0363663 A1* | 12/2017 | Breitlow | H05B 1/0233 |
| 2018/0281708 A1* | 10/2018 | Garrard | B60R 16/0234 |

FOREIGN PATENT DOCUMENTS

| | | |
|---|---|---|
| DE | 10 2004 046 917 A1 | 3/2006 |
| DE | 10 2011 017 675 A1 | 11/2011 |
| DE | 10 2013 008 829 A1 | 11/2014 |
| JP | H05 1526 A | 1/1993 |
| WO | WO 9012951 A1 | 11/1990 |

OTHER PUBLICATIONS

Search report for German Patent Application No. 10 2018 110 382.4, dated Dec. 18, 2018.

E. Otto, et al. "Die Systementwicklung des elektrisch heizbaren Katalysators (E-Kat) für die LEV/ULEV und EUIII Gesetzgebung." ("The system development of the electrically heatable catalyst E-Cat for LEV/ULEV and EU-1II legislation") Stuttgart : Franckh-Kosmos Verlags-GmbG & Co., 1995 (Sonderdruck aus MTZ Motortechnische Zeitung 56, Heft 9).

"Vierleitermessung." ("Four-wire measpurement") Wikipedia, Wikimedia Foundation, last modified Nov, 24, 2018, de.wikipedia. org/wiki/Vierleitermessung.

"Abwärtswandler." ("Down converter") Wikipedia, Wikimedia Foundation, last modified Feb. 6, 2019, de.wikipedia.org/wiki/Abwärtswandler.

* cited by examiner

METHOD FOR DETERMINING THE TEMPERATURE OF AN ELECTRICALLY HEATABLE CATALYTIC CONVERTER

CROSS-REFERENCE TO RELATED APPLICATIONS

This application claims priority from German Patent Application No. 10 2018 110 382.4, filed Apr. 30, 2018, which is hereby incorporated by reference.

FIELD OF THE INVENTION

The invention relates to a method for determining the temperature of an electrically heatable catalytic converter in an exhaust gas system of an internal combustion engine, and an exhaust gas system having such an electrically heatable catalytic converter.

BACKGROUND OF THE INVENTION

In internal combustion engines, the exhaust aftertreatment of the combustion gases takes place by means of catalytic converters situated in the exhaust gas system of the internal combustion engine. However, since these catalytic converters have not yet reached the temperature necessary for converting pollutants, in particular after a cold start of the internal combustion engine, conversion of the pollutants in this cold start phase is inadequate. Electrically heatable catalytic converters are known from the prior art, in which the catalytic converter may be heated by an electric heating element, independently of the exhaust gas flow. The period of time in which the catalytic converter has not yet reached the temperature necessary for converting pollutants may thus be shortened. It is therefore possible to convert harmful exhaust gas components more quickly after a cold start, and thus to reduce the emissions of a motor vehicle.

The operation of an electrically heatable catalytic converter requires an actuator for the power supply. For example, a controlled power converter that has devices for current and voltage measurement may be used as an actuator.

In general, the component temperature of the catalytic converters in the exhaust gas system of a motor vehicle is of interest, on the one hand to monitor the functioning of the catalytic converter, and on the other hand to stay within temperature limits, above which the functioning of the catalytic converter is limited and/or there is risk of thermal damage to the catalytic converter.

In principle, the component temperature of a catalytic converter may be determined by using temperature sensors in the exhaust gas system. However, this results in a corresponding cost increase for the exhaust gas system. Therefore, the component temperature is generally determined based on models that calculate the component temperature of the catalytic converters in the exhaust gas system based on a measured or calculated exhaust gas temperature.

By use of an electrically heatable catalytic converter, it is possible to increase the temperature of the catalytic converter in the cold start phase, and thus to speed up the conversion of harmful exhaust gas components after the cold start. Such an electrically heatable catalytic converter may be situated in a position near the engine, or also in an underbody position of a motor vehicle. In determining the component temperature based on a calculation model, due to the numerous environmental influences, uncertainties are to be expected which increase with increasing distance of the catalytic converter from the exhaust outlet of the internal combustion engine. Therefore, for a catalytic converter in the underbody position of the motor vehicle, only inadequate modeling of the exhaust gas temperature may be possible, and the determined temperature may correspondingly differ greatly from the actual component temperature.

It is known from the prior art to determine the component temperature in an electrically heatable catalytic converter based on the resistance of the electric heating element. Since the heating resistance of an electrically heatable catalytic converter is generally highly dependent on the component temperature, and increases with increasing component temperature at the same current intensity, the component temperature of the electrically heatable catalytic converter may be derived from the heating resistance for a known voltage and a known current intensity.

A method for determining the component temperature of an electrically heatable catalytic converter is known from DE 89 05 073 U1, the catalytic converter being made up of electrically conductive trays, and the temperature being determined by a temperature-related change in the resistance.

It is known from DE 10 2004 046 917 to determine, in an electrically heatable catalytic converter, the temperature of the catalytic converter via the change in the resistance of the electric heating wire, wherein the electrical heating of the catalytic converter is switched off as soon as the component temperature determined in this way is above an activation temperature (light-off temperature) of the catalytic converter, and the catalytic converter is then further heated chemically by the catalytic reaction.

DE 10 2011 017 675 A1 discloses a method in which the temperature characteristic curve of an electrically heatable catalytic converter is determined based on the temperature-related change in the electrical resistance of a heating element of the electrically heatable catalytic converter.

SUMMARY OF THE INVENTION

The object of the invention is to further improve the determination of the component temperature of an electrically heatable catalytic converter, based on the temperature-related change in the heating resistance.

According to the invention, the object is achieved by a method for determining the temperature of an electrically heatable catalytic converter in an exhaust gas system of an internal combustion engine. The electrically heatable catalytic converter includes a heating resistor having a temperature-dependent resistance, the component temperature of the electrically heatable catalytic converter being determined from the temperature-dependent electrical resistance of the heating resistor. It is provided that the energization of the electric heating resistor takes place by closing a switch in a circuit that connects a battery of a motor vehicle to the electric heating resistor, and the component temperature is determined from the electrical resistance for a known current intensity and a known voltage. By use of a method according to the invention, determining the average component temperature of the electrically heatable exhaust gas catalytic converter, in particular an electrically heatable three-way catalytic converter or an electrically heatable four-way catalytic converter, is possible without an additional temperature sensor. The heating resistor is preferably designed as a heating disk that is mechanically connected to the catalytic converter body of the electrically heatable catalytic converter to allow the electrical energy to be efficiently introduced into the catalytic converter body. The component temperature of the electrically heatable catalytic converter is determined based on a measured value, and therefore has comparatively low susceptibility to interference from environmental influences, which in a model-based determination of the temperature can be taken into account inadequately, if at all. By use of a switchable circuit, particularly simple control of the electric heating resistance is possible, so that the heating resistor in each case is energized only briefly and thus heated, as the result of which the energy efficiency and the durability of the heating resistor and of the electrically heatable catalytic converter may be increased.

Advantageous improvements and refinements of the method, set forth in the independent claim, for determining the component temperature of an electrically heatable catalytic converter are possible via the features stated in the dependent claims.

In one preferred embodiment of the invention, it is provided that the component temperature of the electrically heatable catalytic converter is determined in an operating phase in which electrical heating of the electrically heatable catalytic converter is not provided. By briefly actuating the electric heating resistor, only a small quantity of energy is introduced into the electrically heatable catalytic converter, so that the temperature of the electrically heatable catalytic converter does not significantly change during the measurement and may be regarded as essentially constant. Thus, a comparatively accurate determination of the component temperature of the electrically heatable catalytic converter may take place, in particular in operating states in which no electrical heating of the catalytic converter is provided.

It is preferred when the energization period for the resistance measurement in such a phase is selected to be between 50 µs and 200 µs. The measurement phase should be designed to be short enough to keep the energy input into the heating resistor low. Overheating of the heating element and excessive power consumption are thus avoided. An even shorter actuation period could result in measuring errors, since for a shorter measuring period the measurement system has not yet reached its steady state. Longer measurement phases lead to unnecessarily high energy input and result in increased aging of the heating resistor.

In one advantageous embodiment of the method, it is provided that a correction factor is determined which takes into account a change in the electrical resistance of the heating resistor due to aging of the electrically heatable catalytic converter. By use of a correction factor, operation-related aging of the electrical resistance of the heating resistor may be compensated for, and the accuracy in measuring the component temperature may thus be improved over the service life of the electrically heatable catalytic converter.

In one preferred embodiment of the invention, it is provided that the power input into the measuring circuit takes place by means of a down converter that is controlled by pulse width modulation. Any desired power input between zero and maximum power may be provided with the aid of a pulse width modulation-controlled down converter, in particular a down converter with MOSFET switches, particularly preferably with a MOSFET circuit having a multi-phase design. The power input is limited by the battery voltage and the electrical resistance of the heating resistor.

It is preferred when the measurement of electrical current intensity and voltage takes place at least ten times within a pulse width modulation period. Control of the electric current also requires it to be measured. This measurement of electric current intensity I and voltage U should take place at least ten times within a pulse width modulation period to allow good averaging. The electrical resistance of the heating resistor may also be determined in phases in which the electrically heatable catalytic converter is not heated, and the component temperature may be calculated therefrom. This is carried out either by switching on the switch in the circuit once, or by clocking multiple times with a small pulse width modulation ratio until the system has reached a steady state. For one-time switching, the duration of the energization should be at least five times the electrical system time constant, which as an approximation results from a series connection of the heating resistor and an inductor L.

It is particularly preferred that a temperature controller for the electrically heatable catalytic converter utilizes the down converter as a continuous current controller. In this regard, continuous measurement of the current intensity and the voltage is provided.

In another improvement of the method, it is provided that in addition to the electrical resistance of the heating resistor, the line resistance of the electrical conductor is taken into account in calculating the temperature. In the simplest case, the line resistance is regarded as constant and is subtracted from the measured resistance of the heating resistor.

In another preferred embodiment of the invention, it is provided that the resistance measurement is carried out using a four-wire measuring method. A so-called four wire measuring method is recommended if the measuring accuracy is to be further increased during the determination of the electrical resistance of the heating resistor. This does not fundamentally change the measurement and control process, but the measuring accuracy may be improved.

According to the invention, an exhaust aftertreatment system for an internal combustion engine having an exhaust gas system is proposed in which an electrically heatable catalytic converter, in particular an electrically heatable three-way catalytic converter or an electrically heatable four-way catalytic converter, is situated. The exhaust aftertreatment system includes a control unit, in particular an engine control unit of the internal combustion engine, that is configured to carry out a method according to the invention when a machine-readable program code is executed by the control unit. In an exhaust aftertreatment system according to the invention, it is possible to determine the component temperature of the electrically heatable catalytic converter accurately and in a comparatively energy-saving manner, so that the catalytic converter may be operated with high efficiency. The conversion performance of the catalytic converter may thus be increased, and/or the aging behavior of the catalytic converter may be improved.

Further preferred embodiments of the invention result from the other features set forth in the subclaims.

The various embodiments of the invention mentioned in the present patent application, unless stated otherwise in the individual case, may advantageously be combined with one another.

BRIEF DESCRIPTION OF THE DRAWINGS

The invention is explained below in exemplary embodiments with reference to the associated drawings, which show the following.

DETAILED DESCRIPTION OF THE INVENTION

Figure 1:
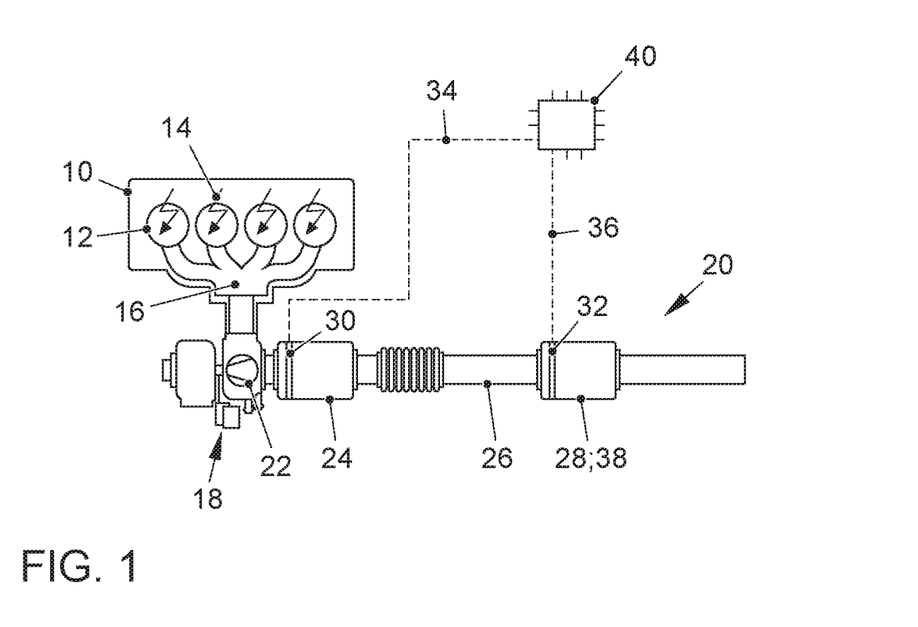
FIG. 1 shows an internal combustion engine having an exhaust gas system in which an electrically heatable catalytic converter for exhaust aftertreatment of the combustion gases of the internal combustion engine is situated.

FIG. 1 shows an internal combustion engine 10, the exhaust outlet 16 of which is connected to an exhaust gas system 20. The internal combustion engine 10 is preferably designed as a spark ignition internal combustion engine 10 according to the Otto principle, and has a plurality of combustion chambers 12, on each of which at least one spark plug 14 for igniting an ignitable fuel-air mixture is situated. Alternatively, the internal combustion engine 10 may be designed as an auto-ignition internal combustion engine according to the Diesel principle. The internal combustion engine 10 is preferably designed as an internal combustion engine 10 that is supercharged by means of an exhaust gas turbocharger 18. Alternatively, the internal combustion engine 10 may be designed as a naturally aspirated engine that is not supercharged, or as an internal combustion engine 10 that is supercharged by means of a compressor or an electric compressor. The exhaust gas system 20 includes an exhaust duct 26, with a turbine 22 of the exhaust gas turbocharger near the engine, and downstream from the turbine 22 a catalytic converter 24 near the engine, and further downstream, preferably in the underbody position of a motor vehicle, a second catalytic converter 28, being situated in the flow direction of an exhaust gas through the exhaust gas system 20. At least one of the catalytic converters is designed as an electrically heatable catalytic converter 24, 28, preferably as an electrically heatable three-way catalytic converter or as an electrically heatable four-way catalytic converter 38. Alternatively, the electrically heatable catalytic converter 24, 28 may be designed as an SCR catalytic converter or as some other exhaust aftertreatment component. At least one of the catalytic converters 24, 28, 38 has an electric heating element 30, 32, in particular a heating disk, with which the catalytic converter 24, 28, 38 may be heated independently of the exhaust gas flow of the internal combustion engine 10. For this purpose, the electric heating elements 30, 32 are connected to a control unit 40 of the internal combustion engine 10 via signal lines 34, 36, respectively.

Figure 2:
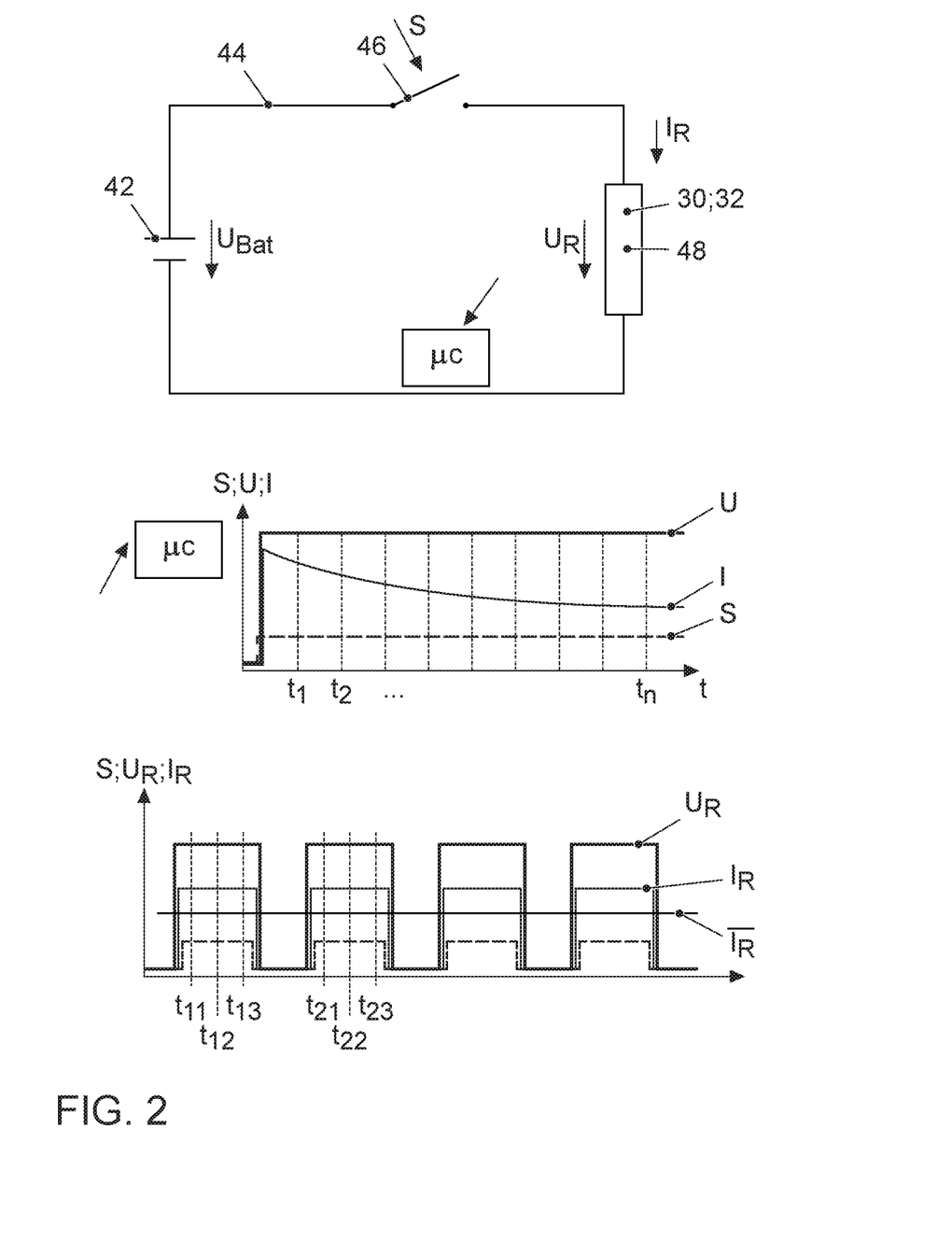
FIG. 2 shows an electrical switching circuit for controlling an electric heating resistor for electrically heating a catalytic converter.

FIG. 2 illustrates an electrical switching circuit for the electric heating element 30, 32, in particular for a heating resistor 48. The switching circuit includes a circuit 44 that connects a battery 42 of the motor vehicle to the electric heating resistor 48. The electric heating resistor 48, as a metal foil or metal wire, is preferably integrated into the substrate material of the electrically heatable catalytic converter 24, 28, 38. In addition, the switching circuit has a switch 46 with which the power supply to the heating resistor 48 may be easily interrupted or activated. The battery 42 may be, for example, a 12-volt battery or a 48-volt battery of a motor vehicle having an internal combustion engine. Alternatively, in a hybrid vehicle the battery 42 may be the high-voltage battery for the electric drive motor. The voltage UR at the heating resistor 48 is preferably sampled by a microcontroller pc. The current intensity IR is preferably measured by shunts or by a current transformer in combination with a microcontroller pc. The switch 46 is designed as a relay or as a MOSFET, for example. The heating resistance R results from the voltage $U_R$ and the current intensity $I_R$ via the relationship $R=U_R/I_R$. The component temperature of the electrically heatable catalytic converter 24, 28, 38 is then a function of the resistance R, which changes as a function of the temperature of the catalytic converter 24, 28, 38. In the simplest case, the energization of the electric heating resistor 48 may take place by temporarily switching on the circuit 44. When the desired component temperature of the electrically heatable catalytic converter 24, 28, 38 is reached or a certain time period has elapsed, the circuit 44 is reopened by opening the switch 46. By briefly energizing the electric heating resistor 48, a resistance measurement may also be carried out during operating phases in which the catalytic converter 24, 28, 38 is not to be heated. The measurement phases should be designed to be short enough to keep the energy input into the heating resistor 48 low. Overheating of the heating resistor 48 and excessive power consumption are thus avoided.

An average component temperature is determined using the proposed method. The average component temperature is based on measurement, and is therefore robust against environmental influences that cannot be taken into account via a model calculation in a determination of the component temperature. Aging effects of the electric heating resistor 48 may be adapted when the resistance is determined for components having relevant aging, and at a known ambient temperature.

Clocked opening and closing of the switch 46 results in a clocked voltage U and a clocked current intensity I, which may be interpreted as an average voltage and an average current intensity, respectively. The clocking may take place similarly as for pulse width modulation clocking, such as with the down converter, or with a lower clock frequency. Such a measurement typically takes place during the switch-on phase of the electrically heatable catalytic converter 24, 28, 38 after the cold start of the internal combustion engine 10.

Figure 3:
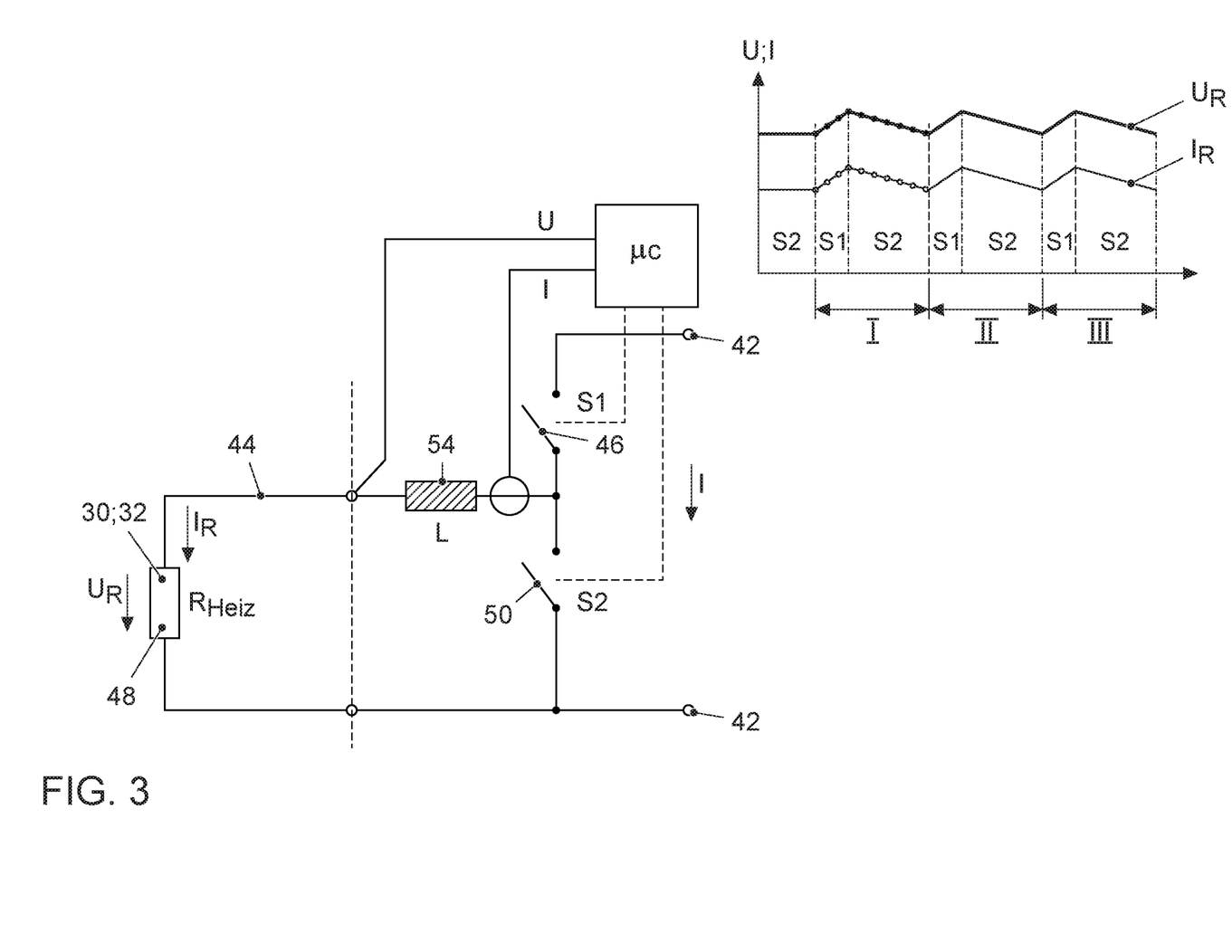
FIG. 3 shows another electrical switching circuit for controlling an electric heating resistor of an electrically heatable catalytic converter.

FIG. 3 illustrates a preferred exemplary embodiment of the electrical circuit 44 for heating the electrically heatable catalytic converter 24, 28, 38. Any desired power input between zero and maximum power may be provided by use of a pulse width modulation-controlled down converter that is preferably designed with MOSFET switches 46, 50. Compared to the exemplary embodiment illustrated in FIG. 2, the circuit 44 additionally includes a second switch 50 and an inductor, in particular a coil 54. Control of the electric current also requires it to be measured. The measurement of the current intensity $I_R$ and the voltage $U_R$ should take place at least ten times within a pulse width modulation period to allow good averaging. The component temperature of the electrically heatable catalytic converter via the temperature-dependent electrical resistance R of the heating resistor 48 may be determined, for example, by switching on the switch 46 once for a duration of at least five times the electrical system time constant, or by clocked switching multiple times with a small pulse width modulation ratio.

Figure 4:
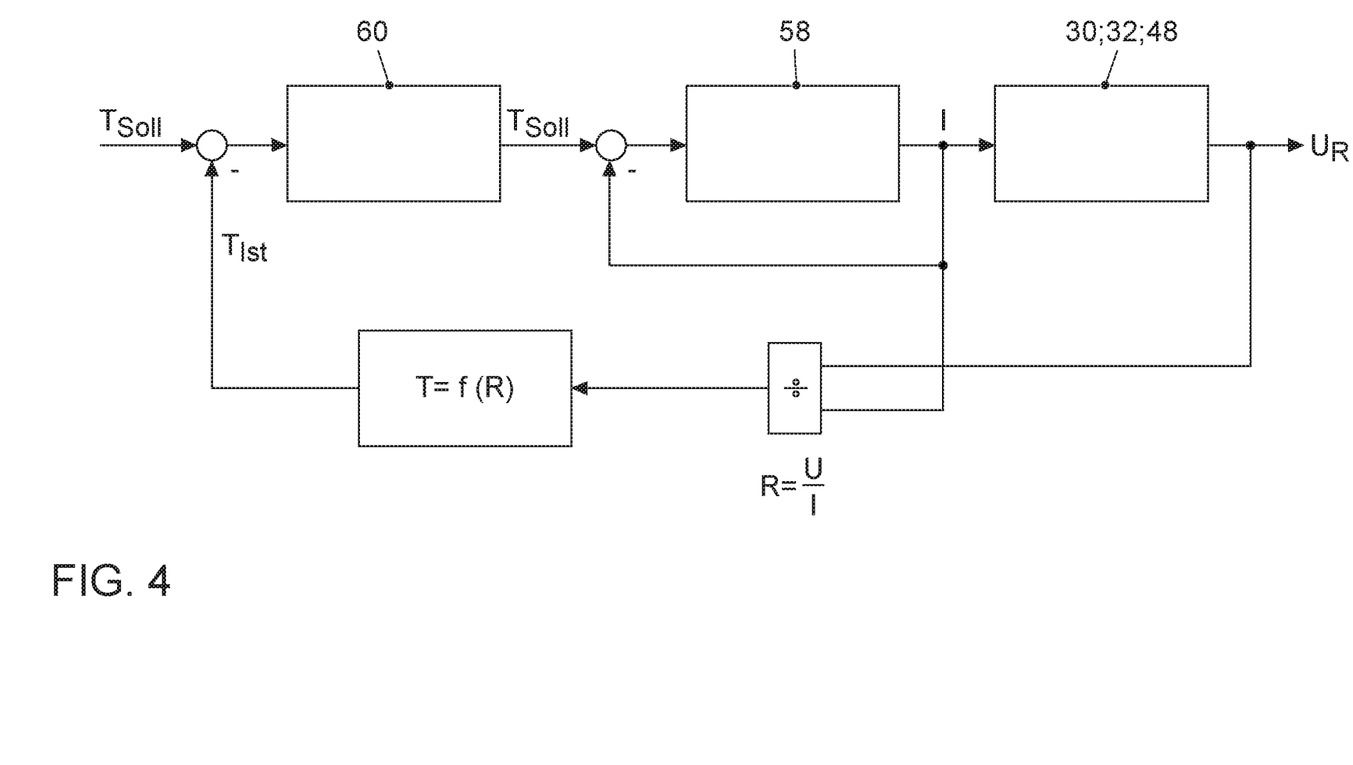
FIG. 4 shows a controller arrangement for temperature and current control for the electric heating resistor of the electrically heatable catalytic converter.

FIG. 4 shows a refinement of the measuring arrangement illustrated in FIG. 3. Temperature control 60 for the electrically heatable catalytic converter 24, 28, 38 takes place, and the down converter illustrated in FIG. 3 is utilized as a continuous current controller 58.

Figure 5:
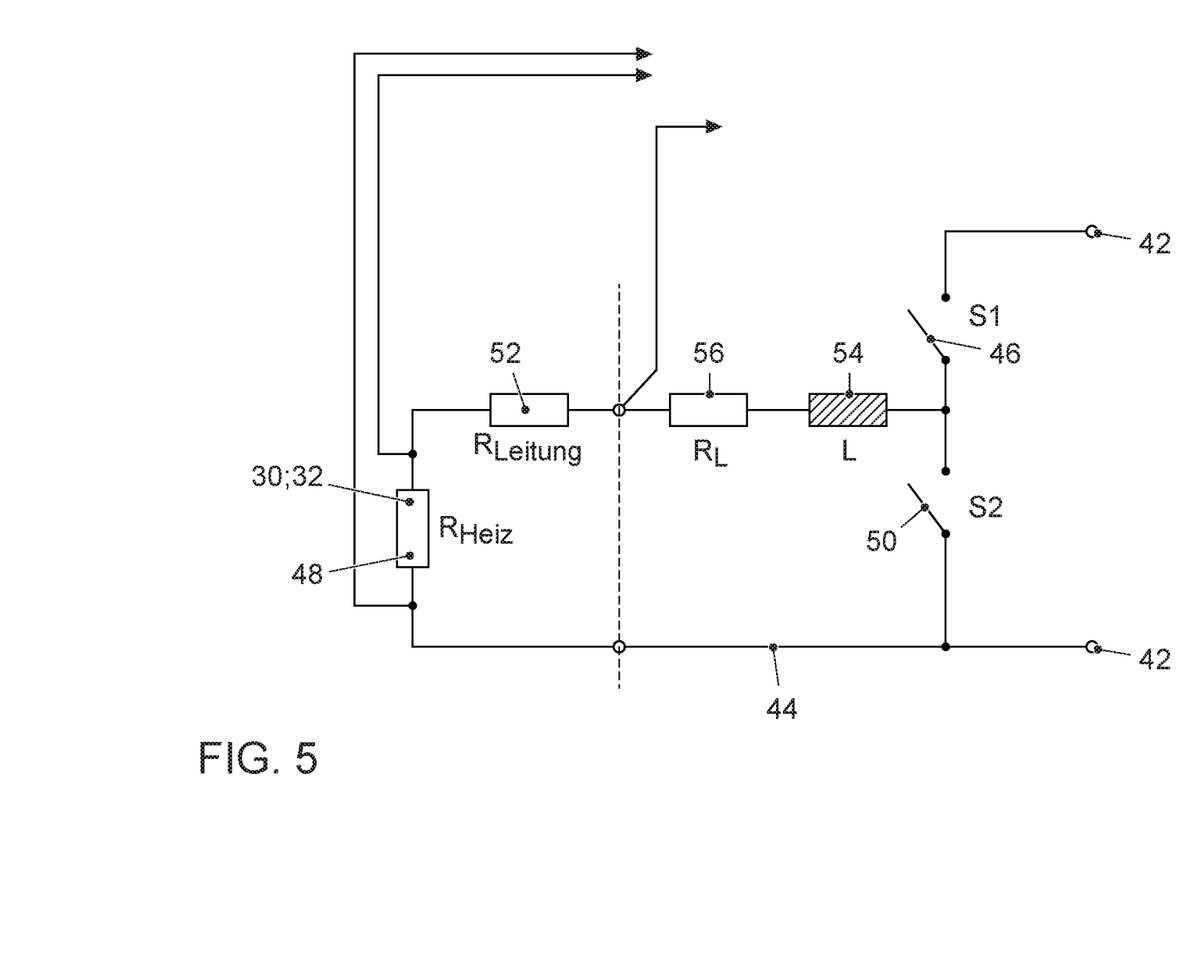
FIG. 5 shows another electrical switching circuit for controlling an electric heating resistor of an electrically heatable catalytic converter.

FIG. 5 illustrates another exemplary embodiment of a circuit 44 for heating the electrically heatable catalytic converter 24, 28, 38. Since in actual operation, in addition to the electrical resistance R of the heating resistor 48 the lines also have an electrical resistance 52, 56, these resistances 52, 56 may also be taken into account. The line resistances and contact resistances may be compensated for in a suitable manner within the scope of calculating the electrical resistance R of the heating resistor 48. In the simplest form, the line resistances are assumed to be constant and are subtracted from the measured resistance R. A so-called four wire measuring method, illustrated in FIG. 5, is recommended if the measuring accuracy is to be further increased during the determination of the electrical resistance R of the electrically heatable catalytic converter 24, 28, 38. This does not fundamentally change the measurement and control process, but the expected measuring accuracy for the resistance measurement is increased. The deviation in the component temperature of the electrically heatable catalytic converter 24, 28, 38 during the temperature determination may also be further reduced in this way.

LIST OF REFERENCE NUMERALS 10 internal combustion engine
12 combustion chamber
14 spark plug
16 exhaust outlet
18 exhaust gas turbocharger
20 exhaust gas system
22 turbine
24 catalytic converter near the engine
26 exhaust duct
28 second catalytic converter
30 first heating element
32 second heating element
34 signal line
36 signal line
38 four-way catalytic converter
40 control unit
42 battery
44 circuit
46 first switch
48 heating resistor
50 second switch
52 line resistance
54 coil
56 second line resistance
58 current controller
60 temperature controller
I current intensity
L coil
R resistance
S switch
U voltage
t time

The invention claimed is:

1. A method for determining the temperature of an electrically heatable catalytic converter in an exhaust gas system of an internal combustion engine, wherein the electrically heatable catalytic converter includes a heating resistor having a temperature-dependent resistance, comprising:
    energizing the electric heating resistor by closing a switch in a circuit that connects a battery to the electric heating resistor,
    determining the component temperature of the electrically heatable catalytic converter from the temperature-dependent electrical resistance of the heating resistor, for a known current intensity and a known voltage,
    wherein the power input into the measuring circuit takes place by means of a down converter that is controlled by pulse width modulation, and
    measuring current intensity and voltage at least ten times within a pulse width modulation period.

2. The method according to claim 1, wherein determining the component temperature of the electrically heatable catalytic converter comprises determining the component temperature in an operating phase in which electrical heating is not provided.

3. The method according to claim 2, wherein the energization period for the resistance measurement is selected to be between 50 μs and 200 μs.

4. The method according to claim 1, further comprising determining a correction factor that takes into account a change in the electrical resistance of the heating resistor due to aging of the electrically heatable catalytic converter.

5. The method according to claim 1, wherein a temperature controller for the electrically heatable catalytic converter utilizes the down converter as a continuous current controller.

6. The method according to claim 1, wherein determining the component temperature of the electrically heatable catalytic converter takes into account the line resistance of the electrical conductor in addition to the electrical resistance of the heating resistor.

7. The method according to claim 1, wherein the resistance measurement is carried out using a four-wire measuring method.

8. An exhaust aftertreatment system for an internal combustion engine comprising:
    an exhaust gas system in which an electrically heatable catalytic converter is situated, and
    a control unit that is configured to carry out a method according to claim 1 when a machine-readable program code is executed by the control unit.

* * * * *